(12) United States Patent
Wei

(10) Patent No.: US 11,964,874 B2
(45) Date of Patent: Apr. 23, 2024

(54) ETCHED NON-POROUS PARTICLES AND METHOD OF PRODUCING THEREOF

(71) Applicant: AGILENT TECHNOLOGIES, INC., Santa Clara, CA (US)

(72) Inventor: Ta-Chen Wei, Wilmington, DE (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 17/234,352

(22) Filed: Apr. 19, 2021

(65) Prior Publication Data

US 2021/0380421 A1 Dec. 9, 2021

Related U.S. Application Data

(60) Provisional application No. 63/036,524, filed on Jun. 9, 2020.

(51) Int. Cl.
| | | |
|---|---|---|
| *B01J 20/28* | (2006.01) | |
| *C01B 33/18* | (2006.01) | |
| *C09C 1/30* | (2006.01) | |

(52) U.S. Cl.
CPC ......... *C01B 33/18* (2013.01); *B01J 20/28016* (2013.01); *B01J 20/28021* (2013.01); *C09C 1/3045* (2013.01); *C09C 1/3072* (2013.01); *C09C 1/309* (2013.01); *C01P 2004/61* (2013.01); *C01P 2004/62* (2013.01); *C01P 2006/12* (2013.01); *C01P 2006/14* (2013.01)

(58) Field of Classification Search
None
See application file for complete search history.

(56) References Cited

U.S. PATENT DOCUMENTS

| | | | |
|---|---|---|---|
| 3,922,392 A | * | 11/1975 | Kohlschutter ......... B01J 20/283 427/215 |
| 4,017,528 A | | 4/1977 | Unger et al. |
| 4,775,520 A | | 10/1988 | Unger et al. |
| 4,911,903 A | | 3/1990 | Unger et al. |
| 6,056,877 A | | 5/2000 | Gjerde et al. |
| 6,258,264 B1 | | 7/2001 | Gjerde et al. |
| 6,372,130 B1 | | 4/2002 | Gjerde et al. |
| 6,488,855 B2 | | 12/2002 | Gjerde et al. |
| 6,524,480 B2 | | 2/2003 | Gjerde et al. |

(Continued)

FOREIGN PATENT DOCUMENTS

| | | |
|---|---|---|
| JP | 11302011 | 11/1999 |
| JP | 4044350 B2 | 2/2008 |

(Continued)

OTHER PUBLICATIONS

Zhang et al ("Surface-Protected Etching of Mesoporous Oxide Shells for the Stabilization of Metal Nanocatalysts"; Adv. Funct. Mater. 2010, 20, 2201-2214 (Year: 2010).*

(Continued)

*Primary Examiner* — Hoa (Holly) Le
(74) *Attorney, Agent, or Firm* — Mannava & Kang, P.C.

(57) ABSTRACT

There is disclosed a method of producing etched non-porous particles. The method includes, in some examples, coating a non-porous particle with a hydrophilic polymer and treating the coated particle with acid or base. Also provided is etched non-porous particles capable of separating a variety of analytes, including biomolecules.

12 Claims, 18 Drawing Sheets

(56) References Cited

U.S. PATENT DOCUMENTS

| | | |
|---|---|---|
| 6,528,167 B2 | 3/2003 | O'Gara |
| 7,070,748 B2 | 7/2006 | Unehara et al. |
| 7,175,913 B2 | 2/2007 | O'Gara |
| 8,163,260 B2 | 4/2012 | Kuebelbeck |
| 8,778,453 B2 | 7/2014 | Jiang et al. |
| 8,975,358 B2 | 3/2015 | Shea et al. |
| 9,120,083 B2 | 9/2015 | Wyndham et al. |
| 9,248,383 B2 | 2/2016 | Wyndham et al. |
| 9,265,729 B2 | 2/2016 | Nakamura |
| 9,528,167 B2 | 12/2016 | Rundquist |
| 2005/0230298 A1 | 10/2005 | Jiang et al. |
| 2005/0285290 A1 | 12/2005 | Nakanishi |
| 2008/0210660 A1* | 9/2008 | Stockum ................ C09K 13/04 216/101 |
| 2009/0053524 A1* | 2/2009 | Yamada ................ C01B 33/149 428/404 |
| 2013/0112605 A1 | 5/2013 | Wyndham et al. |
| 2013/0206665 A1 | 8/2013 | Wyndham et al. |
| 2015/0224473 A1 | 8/2015 | Skinley et al. |
| 2016/0184736 A1* | 6/2016 | Wyndham .......... B01J 20/28004 210/656 |

FOREIGN PATENT DOCUMENTS

| | | | |
|---|---|---|---|
| WO | 2005/002722 | 1/2005 | |
| WO | 2012/110995 | 8/2012 | |
| WO | WO-2017062226 A1 * | 4/2017 | |
| WO | WO-2019140198 A1 * | 7/2019 | ............ B01J 20/103 |

OTHER PUBLICATIONS

Werner Stober et al., "Controlled Growth of Monodisperse Silica Spheres in the Micron Size Range", Journal of Colloid and Interface Science 26, pp. 62-69 (1968).

K. K. Unger et al., "Evaluation of Advanced Silica Packings for the Separation of Biopolymers by High-Performance Liquid Chromatography", Journal of Chromatography, 395 (1986) pp. 61-72.

Anna Arkhireeva et al., "Synthesis of sub-200 nm silsesquioxane particles using a modified Stober sol-gel route", Journal of Material Chemistry, Sep. 12, 2003, 6 pages.

* cited by examiner

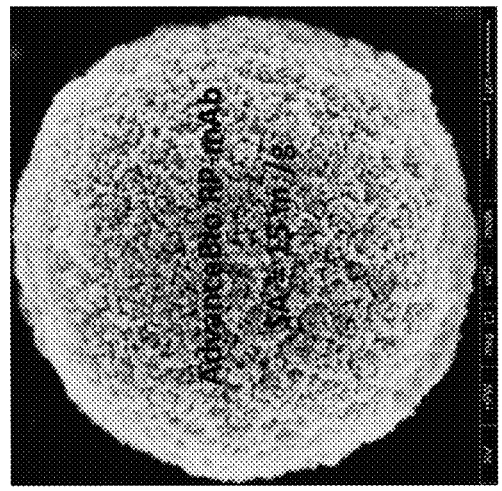
*FIG. 9C*
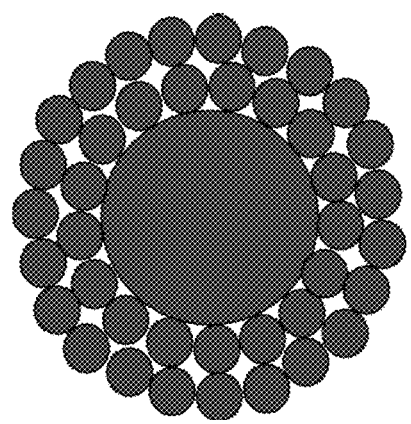
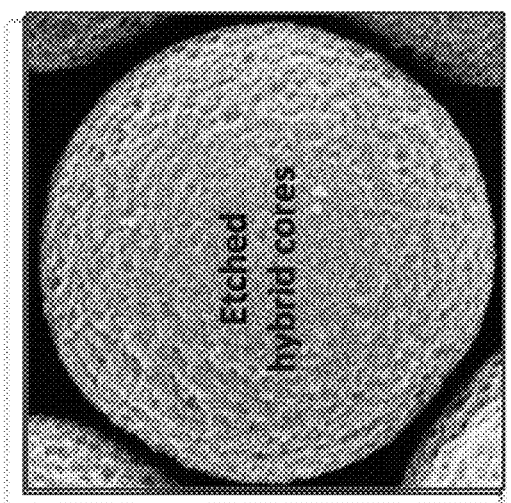
*FIG. 9B*
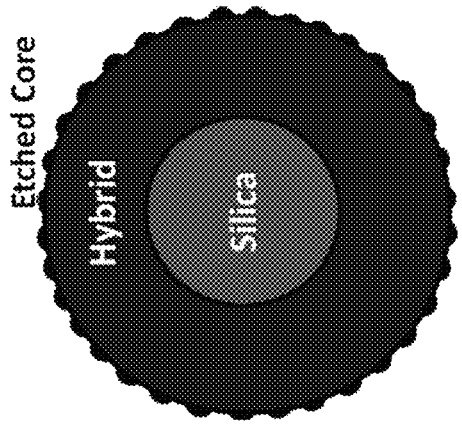
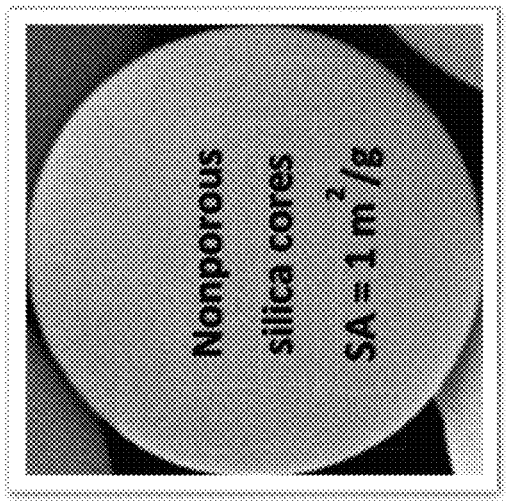
*FIG. 9A*
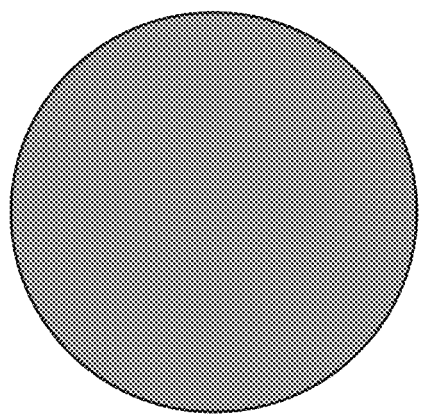

ETCHED NON-POROUS PARTICLES AND METHOD OF PRODUCING THEREOF

RELATED APPLICATION

This application claims priority to U.S. Provisional Application No. 63/036,524, filed Jun. 9, 2020, the entire disclosure of which is hereby incorporated by reference.

BACKGROUND

Non-porous stationary phases have gained interest since the mid-1980s for their ability to rapidly separate proteins in high performance liquid chromatography (HPLC). Due to the lack of any pore structure, an advantage of the non-porous particles is the absence of intraparticle diffusion resistance, which leads to fast protein separation. However, the retention time of stationary phases that use such particles is short, and sample loading capacity is significantly lower when compared to porous particles. Most non-porous particles are also made from silica, which limits their usage in high pH conditions. There is, therefore, a need for high-pH-stable non-porous particles with improved loading capacities and longer retention times.

The present disclosure provides a solution to this problem through the synthesis of non-porous inorganic/organic particles with etched rough surfaces. Such particles have much higher surface areas than typical non-porous particles and can improve the sample loading capacity and peak capacity. The process described herein can be performed without the need for particle size classification, and is easier and shorter than current processes of making porous particles. Additionally, the hybrid chemistry of the particles provides improved high pH-stability compared to silica.

BRIEF SUMMARY OF THE INVENTION

In one aspect, a method of producing etched non-porous particles is provided herein. The method includes providing a plurality of non-porous particles at least partially coated with at least one of a hydrophilic polymer, an inorganic metal oxide, a hybrid metal oxide, or a magnetic material; and contacting the plurality of non-porous particles with an acid or base to produce a plurality of etched non-porous particles.

In another aspect, a method of producing etched metal oxide particles is provided herein. The method includes providing a plurality of inorganic or hybrid metal oxide particles; optionally coating the inorganic or hybrid metal oxide particles with at least one hydrophilic polymer; and contacting the plurality of inorganic or hybrid metal oxide particles with an acid or base to produce a plurality of etched metal oxide particles.

In a further aspect, a non-porous inorganic metal oxide or hybrid metal oxide particle is provided. The particle includes an etched surface and has a pore volume of from about 0.001 to about 0.1 cm$^3$/g, a surface area of from about 2 to about 100 m$^2$/g, or a combination thereof.

Advantageously, in some examples, the method provides etched particles that have longer retention times than non-porous particles, have similar retention times compared to wide pore superficially porous particles, and comparable retention times to completely porous wide pore particles. Advantageously, in some examples, the method provides etched particles that are not susceptible to restricted diffusion of large biomolecules, such as proteins and antibody fragments.

Additional features and advantages of various examples will be set forth, in part, in the description that follows, and will, in part, be apparent from the description, or may be learned by the practice of various examples. The objectives and other advantages of various examples will be realized and attained by means of the elements and combinations particularly pointed out in the description herein.

BRIEF DESCRIPTION OF THE FIGURES

The drawings illustrate generally, by way of example, but not by way of limitation, various embodiments of the present application.

FIGS. 9A-9C show a comparison of SEM images of a non-porous silica core (FIG. 9A); an etched hybrid silica core according to one example (FIG. 9B); and a porous silica particle (AdvanceBio RP-mAb, FIG. 9C).

DETAILED DESCRIPTION OF THE INVENTION

Figure 1A:
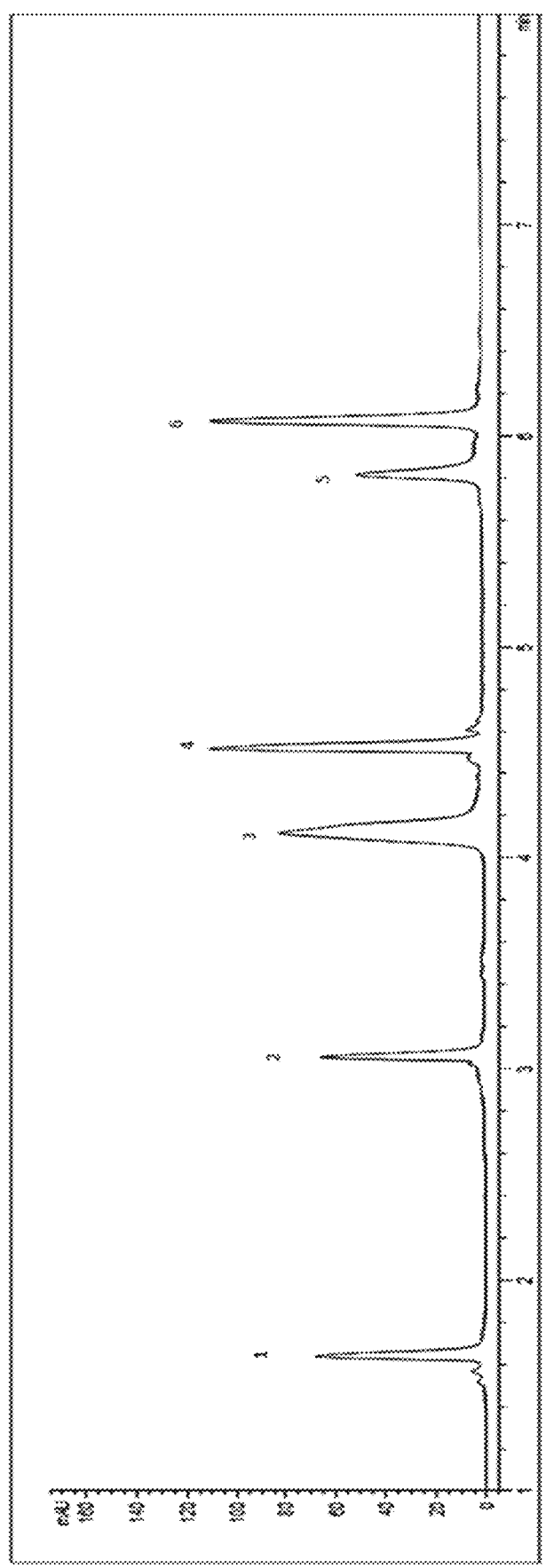
FIGS. 1A-1B show chromatograms of protein separation using a non-porous etched silica core column according to one example (FIG. 1A), and a commercially available porous particle column (Agilent AdvanceBio RP-mAb, FIG. 1B). Chromatographic conditions: temp.=60° C.; flow rate=0.3 mL/min; injection volume=2.0 µL; gradient=20-56% B over 9 min; sample MW range=12-240 kDa. The samples tested were identified by the following numbered peaks: 1-ribonuclease A (13.5 kDa), 2-cytochrome C (12.3 kDa), 3-holo-transferrin (76.5 kDa), 4-α-lactalbumin (14.2 kDa), 5-catalase (240 kDa), and 6-carbonic anhydrase (30 kDa). In some examples, for the gradient, Mobile Phase A is 0.1% TFA in water and mobile B is 0.08% TFA in acetonitrile. The chromatogram is under a gradient from 20% to 56% of mobile B in 9 minutes.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH═C═CCH$_2$, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "aryl" as used herein refers to cyclic aromatic hydrocarbon groups that do not contain heteroatoms in the ring. Thus, aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "amine" as used herein refers to primary, secondary, and tertiary amines having, e.g., the formula N(group)3 wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3$+, wherein each R is independently selected, and protonated forms of each, except for —NR$_3$+, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (Ca-Cb)hydrocarbyl, wherein a and b are integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-Cb)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "independently selected from" as used herein refers to referenced groups being the same, different, or a mixture thereof, unless the context clearly indicates otherwise. Thus, under this definition, the phrase "X1, X2, and X3 are independently selected from noble gases" would include the scenario where, for example, X1, X2, and X3 are all the same, where X1, X2, and X3 are all different, where X1 and X2 are the same but X3 is different, and other analogous permutations.

The term "room temperature" as used herein refers to a temperature of about 15° C. to 28° C.

The term "standard temperature and pressure" as used herein refers to 20° C. and 101 kPa.

Methods of Producing Etched Non-Porous Particles

In one example, a method of producing etched non-porous particles includes providing a plurality of non-porous particles at least partially coated with at least one of a hydrophilic polymer, an inorganic metal oxide, a hybrid metal oxide, or a magnetic material; and contacting the plurality of non-porous particles with an acid or base to produce a plurality of etched non-porous particles.

The non-porous particles can have, in some examples, a diameter or average diameter of from about 0.3 μm to about 10 μm. In one example, the diameter or average diameter of the non-porous particles can be about 0.3, 0.4, 0.5, 0.6, 0.7, 0.8, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, or about 10 μm. The non-porous particles can have a surface area of from about 0.01 m$^2$/g to about 2 m$^2$/g, which is the surface area of the non-porous particle before exposure to any etching process described herein. In one example, the surface area of the non-porous particles can be about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or about 2.0 m2/g. The D90/D10 ratio for the non-porous particles can be, in some examples, from about 1.00 to about 1.50. In one example, the D90/D10 ratio for the non-porous particles can be about 1.00, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, or about 1.4, 1.41, 1.42, 1.43, 1.44, 1.45, 1.46, 1.47, 1.48, 1.49, 1.50. The non-porous particles, in some examples, are not monodisperse. The non-porous particles, in some examples, are monodisperse.

The partial coating on the non-porous particles can be at least about or equal to about 50% or less, 55%, 60%, 65%, 70%, 75%, 85%, 90%, 95%, 98%, 99%, 99.5%, or about 99.9% of the surface area of a given non-porous particle. The amount of surface area coated on the non-porous particles can be an average surface area, such that the average coated surface area of a plurality of the non-porous particles is at least about or equal to about 50% or less, 55%, 60%, 65%, 70%, 75%, 85%, 90%, 95%, 98%, 99%, 99.5%, or about 99.9%. In some examples, the coated surface area or average surface area of the non-porous particle or plurality of non-porous particles is completely (100%) coated.

In one example, the non-porous particles can be made of a polymeric material and the coating is at least one of an inorganic metal oxide, a hybrid metal oxide, or a magnetic material. Suitable polymeric materials can include polystyrene, poly(methyl methacrylate), poly(ethylene oxide), polyurethane, poly(vinyl benzyl chloride), poly(vinyl pyrrolidone), and the like. Suitable polymeric materials can also include co-polymers such as acrylonitrile butadiene styrene, poly(styrene acrylic acid), poly(styrene methyl methacrylate), and the like.

The inorganic metal oxide coating is not particularly limited, and can, in some examples, be a metal oxide or a mixed metal oxide. In some examples, the inorganic metal oxide can be ZnO, $SiO_2$, and the like, or a mixed metal oxide such as $M/SiO_2$, where M can be Au, Ag, Ni, Fe, Co, FeNi, ZnO, CdS, AgI, CdTe, CdSe, $CaCO_3$, and the like. The hybrid metal oxide coating can be, in some examples, a combination of any inorganic metal oxide described herein and an organic component. The organic component can contain a plurality of C—H groups. In one example, the organic component of the hybrid metal oxide includes an organosilyl group. Suitable organosilyl groups include one or more R—Si moieties where the R group can include a/an hydrocarbyl, alkenyl, alkynyl, aryl, hydroxyl, carboxylic acid, esters, ethers, or amide group, or combinations thereof, and including linear, branched, and cyclic versions of the foregoing. In one example, the plurality of non-porous particles is silica ($SiO_2$) particles with a surface at least partially coated with at least one organosilyl group. The magnetic material can be any suitable ferromagnetic substance such as $Fe_3O_4$, neodymium-based materials, and the like, or a combination of the foregoing magnetic materials with any of the aforementioned inorganic metal oxides and/or hybrid metal oxides.

The hydrophilic polymer can be at least one of poly(N-isopropylacrylamide) (PNIPAM), polyacrylamide (PAM), poly(acrylic acid), polymethacrylate, poly(ethylene glycol), poly(ethylene oxide), poly(2-oxazoline) and polyethylenimine (PEI), poly(vinyl alcohol) (PVA), poly(vinylpyrrolidone) (PVP), and the like, or a combination thereof. In one example, the hydrophilic polymer is PVP. The hydrophilic polymers can have, in some examples, a number average molecular mass or mass average molecular mass of from about 5 kDa to about 200 kDa. The hydrophilic polymers can have, in some examples, a number average molecular mass or mass average molecular mass of about 5, 10, 15, 20, 25, 30, 35, 40, 45, 50, 55, 60, 65, 70, 75, 80, 85, 90, 95, 100, 110, 120, 130, 140, 150, 160, 170, 180, 190, or about 200 kDa.

In one example, the non-porous particle made of the polymeric material at least partially coated with at least one of an inorganic metal oxide, a hybrid metal oxide, or a magnetic material is further at least partially coated with the hydrophilic polymer to create a coated non-porous particle. In one example, the plurality of non-porous particles is made of an inorganic metal oxide, a hybrid metal oxide, or a magnetic material, and are coated with the hydrophilic polymer.

In one example, coating any of the non-porous particles described herein with the hydrophilic polymer can include heating the plurality of non-porous particles in an aqueous medium in the presence of at least one hydrophilic polymer described herein. The heating can be at a temperature, in one example, of from about 30° C. to about 95° C. In some examples, the heating can be at a temperature of about 30, 35, 40, 45, 50, 55, 60, 65, 70, 75, 80, 85, 90, or about 95° C. The heating can be for a period, in some examples, of about 0.5, 1, 2, 3, 4, 5, 6, 7, or about 8 hours, or from about 1 hour to about 8 hours.

Etching

In one example, any non-porous particle described herein that is coated with the hydrophilic polymer can be contacted with the acid or base to produce a plurality of etched non-porous particles. In one example, the plurality of non-porous particles made of an inorganic metal oxide, hybrid metal oxide, or magnetic material and having the hydrophilic polymer coating can be contacted with an acid or base to produce the plurality of etched non-porous particles. The contacting with the acid or base, in some examples, can be for a period of from about 2 hours to about 24 hours. In one example, the contacting with the acid or base can be for about 2, 3, 4, 5, 6, 7, 8, 9, 10, 11, 12, 13, 14, 15, 16, 17, 18, 19, 20, 21, 22, 23, or about 24 hours. In one example, the plurality of etched non-porous particles is washed to remove the hydrophilic polymer. Washing can be done by, for example, re-slurrying the etched non-porous particles in water and methanol about one to ten times. Contacting can include, for example, stirring a suspension or slurry of the non-porous particles coated with hydrophilic polymer as described herein with an aqueous solution of the acid or base. The base can be any suitable base that generates hydroxide ions in aqueous solution and causes the pH to rise above 7. In one example, the base can be an alkali metal hydroxide, ammonium hydroxide, tetramethylammonium hydroxide, and the like, or a combination thereof. Suitable alkali metal hydroxides include LiOH, NaOH, KOH, RbOH, and CsOH. In one example, the acid can be ammonium fluoride, hydrofluoric acid, or a combination thereof. In some examples, the acid can be a soluble fluoride salt such as NaF, KF, and the like. In one example, when acids produce a water-soluble fluoride anion (F—) in solution, the etching can be performed at room temperature. The acid or base concentration used in the etching can be, for example, about 1.0 M to about 5.0 M, or about 1.0, 1.2, 1.4, 1.6, 1.8, 2.0, 2.2, 2.4, 2.6, 2.8, 3.0, 32, 3.4, 3.6, 3.8, 4.0, 4.2, 4.4, 4.6, 4.8, or about 5.0 M.

In some examples, etching of the non-porous particles can increase the pore volume of the particles compared to their pore volume prior to etching by from about 8 to about 20 times. In one example, etching of the non-porous particles can increase the pore volume of the particles compared to their pore volume prior to etching by at least about, or about 8.2, 8.4, 8.6, 8.8, 9, 9.2, 9.4, 9.6, 9.8, 10, 10.2, 10.4, 10.6, 10.8, 11, 11.2, 11.4, 11.6, 11.8, 12, 12.2, 12.4, 12.6, 12.8, 13, 13.2, 13.4, 13.6, 13.8, 14, 14.2, 14.4, 14.6, 14.8, 15, 15.2, 15.4, 15.6, 15.8, 16, 16.2, 16.4, 16.6, 16.8, 17, 17.2, 17.4, 17.6, 17.8, 18, 18.2, 18.4, 18.6, 18.8, 19.0, 19.2, 19.4, 19.6, 19.8, or about 20.0 times.

In one example, a method of producing etched metal oxide particles can include providing a plurality of inorganic or hybrid metal oxide particles; coating the inorganic or hybrid metal oxide particles with at least one hydrophilic polymer; and contacting the plurality of inorganic or hybrid metal oxide particles with an acid or base to produce a plurality of etched metal oxide particles.

Etched Non-Porous Particles

In one example, a non-porous inorganic metal oxide or hybrid metal oxide particle having an etched surface is provided. The etched non-porous inorganic metal oxide particle or etched hybrid metal oxide particle can be composed of any of the respective materials described herein.

In one example, the etched non-porous particle can have a pore volume of from about 0.001 to about 0.1 $cm^3/g$, a surface area of from about 2 to about 100 $m^2/g$, or a combination thereof. In some examples, the etched non-porous particle can have a pore volume of about 0.001, 0.002, 0.004, 0.006, 0.008, 0.01, 0.012, 0.014, 0.016, 0.018, 0.02, 0.022, 0.024, 0.026, 0.028, 0.03, 0.032, 0.034, 0.036, 0.038, 0.04, 0.042, 0.044, 0.046, 0.048, 0.05, 0.052, 0.054, 0.056, 0.058, 0.06, 0.062, 0.064, 0.066, 0.068, 0.07, 0.072, 0.074, 0.076, 0.078, 0.08, 0.082, 0.084, 0.086, 0.088, 0.09, 0.092, 0.094, 0.096, 0.098, or about 0.1 cm$^3$/g. In some examples, the etched non-porous particle can have a surface area of about 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, or about 100 m2/g.

In one example, the non-porous inorganic or hybrid metal oxide particle can include a core comprising a hollow core, an inorganic metal oxide core, a hybrid metal oxide core, a polymeric core, or a magnetic core. The inorganic metal oxide core, hybrid metal oxide core, polymeric core, or magnetic core can be composed of any of the respective materials described herein, or a combination of these materials. In one example, the non-porous particle has the structure shown in FIG. 8. In some examples, the non-porous inorganic or hybrid metal oxide particle can have a washable hydrophilic polymer layer. The hydrophilic polymer layer can be composed of any of the hydrophilic polymers mentioned herein, or combinations of these hydrophilic polymers. In one example, the non-porous inorganic metal oxide or hybrid metal oxide particle can be a silica particle at least partially coated with at least one hydrophilic group, hydrophobic group, or a combination thereof. The hydrophilic group can be, in some examples, a moiety that includes at least one of a nitrogen-containing heterocycle, an amide, a carbamate, a carboxylic acid, a carboxy ester, a methyl ether, cyano, amine, ammonium, sulfonamide, sulfonate, urea, thiourea, hydroxyl, thiol, PEG, a zwitterionic group, and sulfonic acid. The core and/or shell can include, in some examples, various geometries such as a sphere, oval, oblate spheroid, ellipse, and the like.

EXAMPLES

Various embodiments of the present application can be better understood by reference to the following Examples which are offered by way of illustration. The scope of the present application is not limited to the Examples given herein.

Chromatography

All chromatographic tests described in the figures used a mobile phase A of 0.1% TFA (trifluoroacetic acid)/water and a mobile phase B of 0.08% TFA/acetonitrile. Analytes were detected using UV absorption at 220 nm with 8 nm bandwidth at 60° C. using an Agilent 1290 Infinity LC.

Figure 1B:
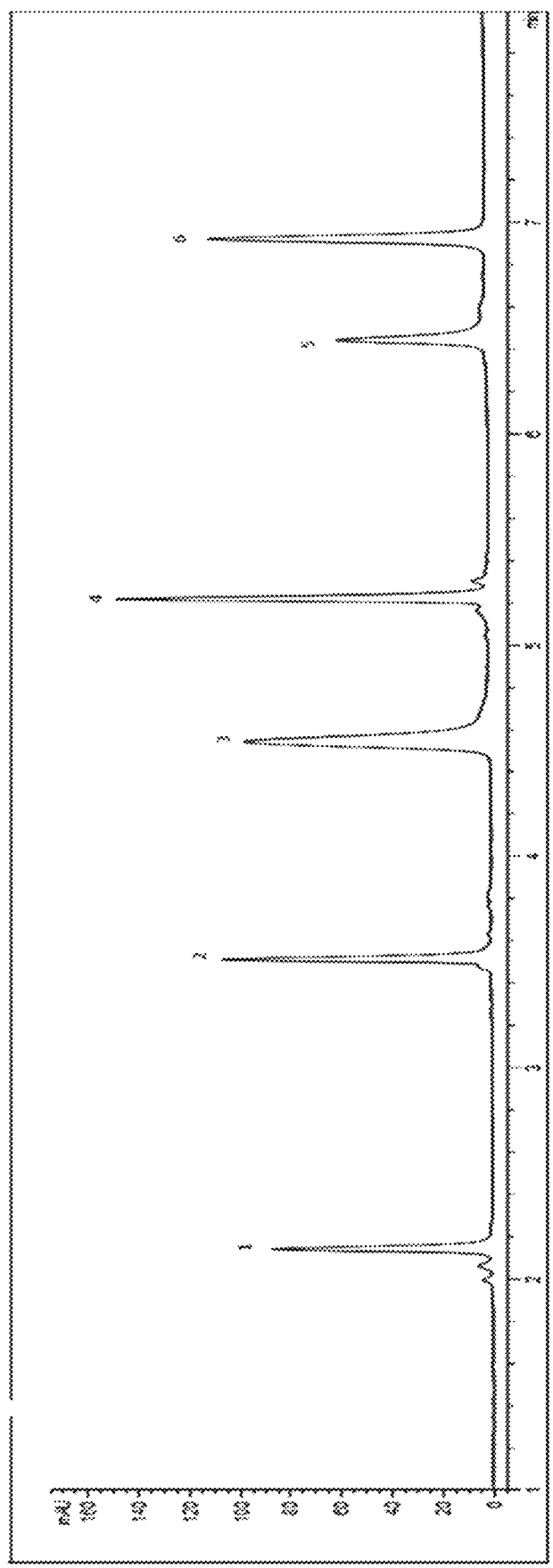

Due to the lack of any pore structure, a major advantage of the non-porous particles was the absence of intraparticle diffusion resistance which leads to fast protein separation. However, the retention time of stationary phases that use such particles is short, and sample loading capacity was significantly lower when compared to porous particles (FIGS. 1A-1B).

Example 1: Sample Method for Producing Etched Non-Porous Particles

The following procedure can be used to make etched non-porous hybrid silica core particles, and can be applied to other non-porous particles described herein.

1. The following were combined: 40 g of non-porous hybrid silica core particles, 400 mL of water, and 20 g of polyvinylpyrrolidone (PVP) in a 500 mL flask. The hybrid silica core particles can be made according to the procedures in U.S. Pat. No. 9,284,456, for example.
2. The aqueous mixture of particles and PVP was heated at 92° C. for 3 hours.
3. After heating, the mixture was centrifuged and the particles were washed twice with water. After this step, the particles were coated with PVP.
4. The PVP-coated particles from step 3 were re-dispersed in 400 mL of water to form a slurry.
5. A solution of 32 g KOH in 200 mL of water was added to the particle slurry.
6. The slurry formed in step 5 was stirred at room temperature for 4 hours.
7. The slurry was centrifuged and the particles were washed twice with water.
8. The washed particles were filtered and dried at 110-120° C. overnight.

Three different etching conditions were applied using a variety of bases, molecular weight of PVP, and reaction temperatures (Table 1).

TABLE 1

| | Selected Etching Reaction Conditions | | | | | |
|---|---|---|---|---|---|---|
| Batch | PVP MW (kDa) | Base | Rxn. T (° C.) | Rxn. time (hr) | Particle Volume (cm$^3$/g) | Particle Surface Area (m$^2$/g) |
| Batch 1 | None | TMAOH | 60 | 4 | 0.047 | 60.3 |
| Batch 2 | 40 | NH$_4$OH | RT | 4 | 0.046 | 44.8 |
| Batch 3 | 10 | NH$_4$OH | RT | 4 | 0.041 | 52.9 |

TMAOH = tetramethylammonium hydroxide;
RT = room temperature

Figure 2A:
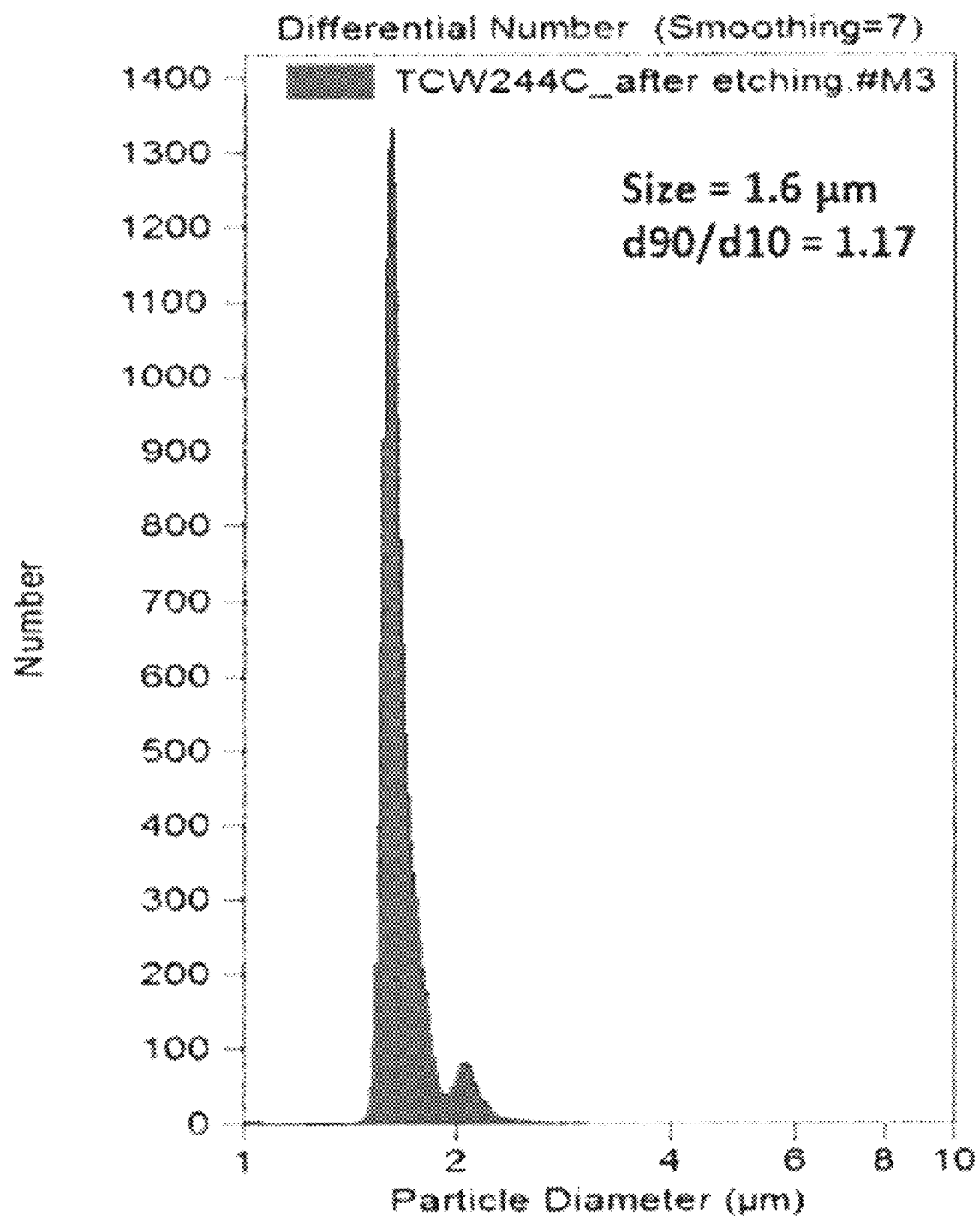
FIGS. 2A-2B show particle size distributions for example Batch 1 (FIG. 2A) and example Batch 2 (FIG. 2B). Batch 1 has etched particles with an average particle diameter of 1.6 µm and d90/d10 of 1.17, in one example. Batch 2 has etched particles with an average particle diameter of 2.7 µm and d90/d10 of 1.14, in one example.
Figure 2B:
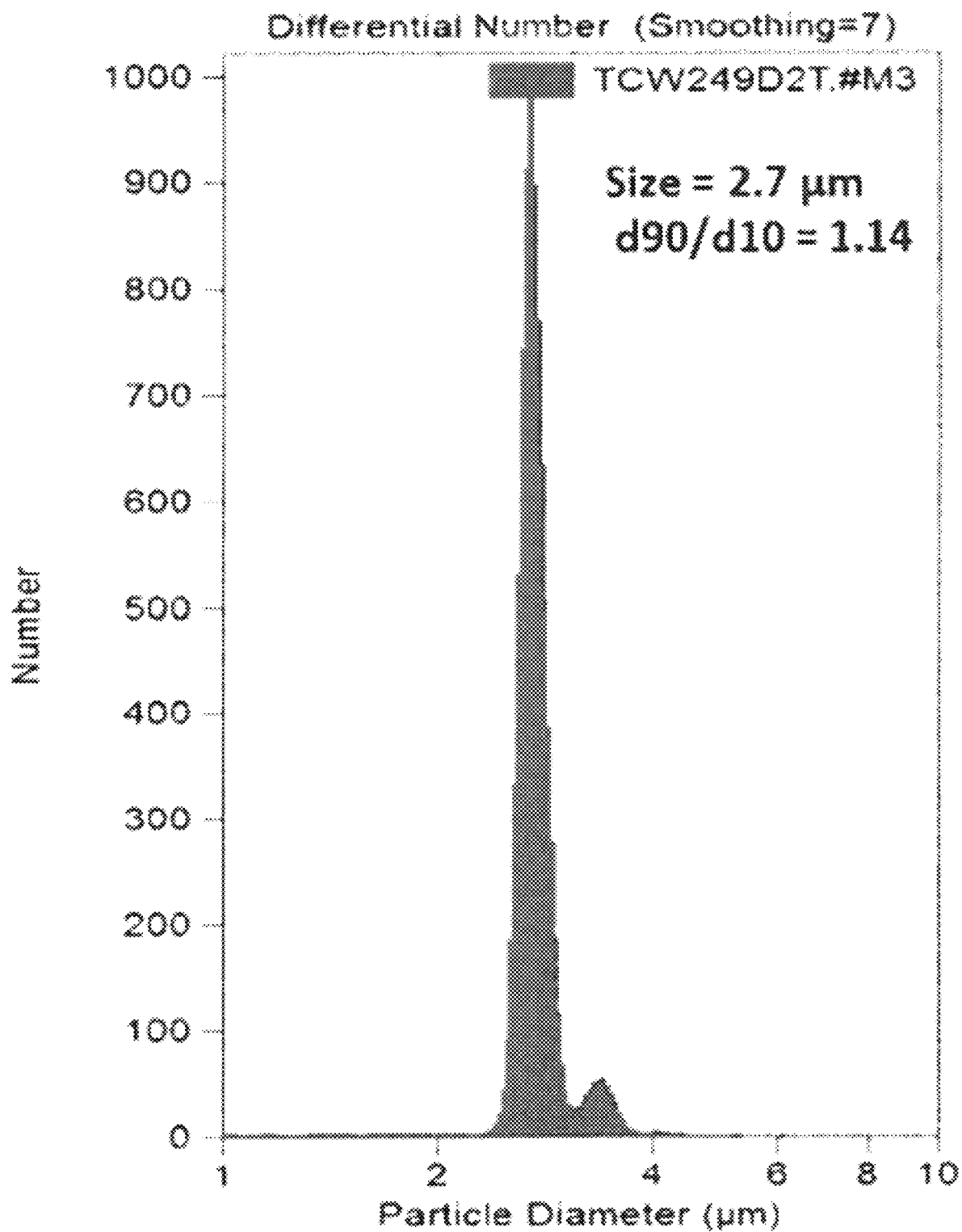

In one example, the etching methods described herein can transform non-porous particles having pore volumes of 0.004 cm$^3$/g to particles with pore volumes of 0.040-0.047 cm$^3$/g after etching. The particle size distribution was very narrow, with a D90/D10 less than 1.20 without any size classification (FIGS. 2A-2B). Advantageously, the process time was much shorter than the time required to manufacture other porous particles, which needed at least twelve weeks to finish.

Figure 3A:
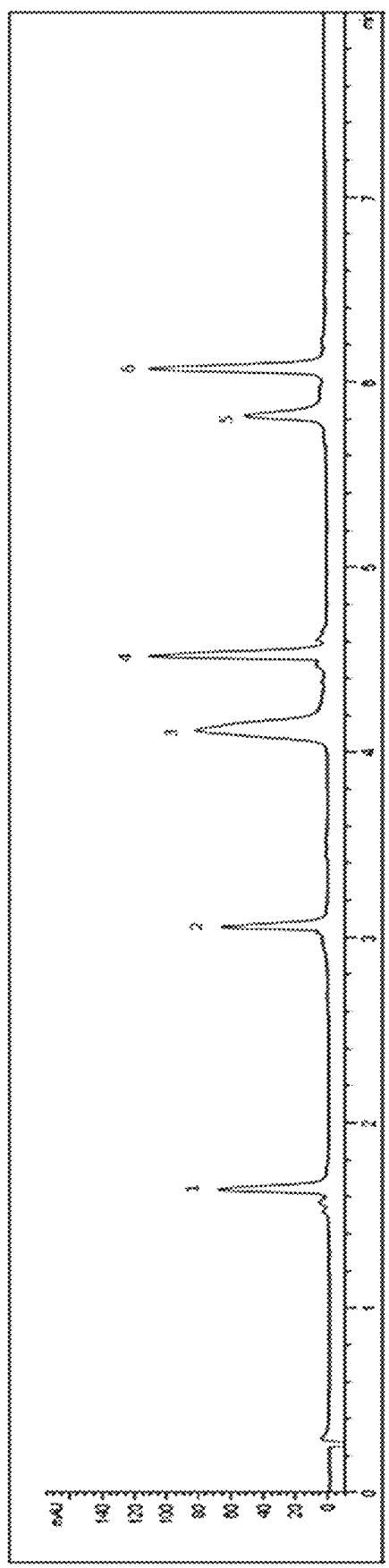
FIGS. 3A-3B show chromatograms of protein separation from a non-porous silica core column (FIG. 3A) and an etched hybrid core column according to one example (FIG. 3B). The samples tested were identified by the following numbered peaks: 1-ribonuclease A (13.5 kDa), 2-cytochrome C (12.3 kDa), 3-holo-transferrin (76.5 kDa), 4-α-lactalbumin (14.2 kDa), 5-catalase (240 kDa), and 6-carbonic anhydrase (30 kDa). The etched hybrid particles (FIG. 3A) show better resolution (narrower peak width and higher peak capacity) and longer retention than nonporous particles (FIG. 3B) for protein separations.
Figure 3B:
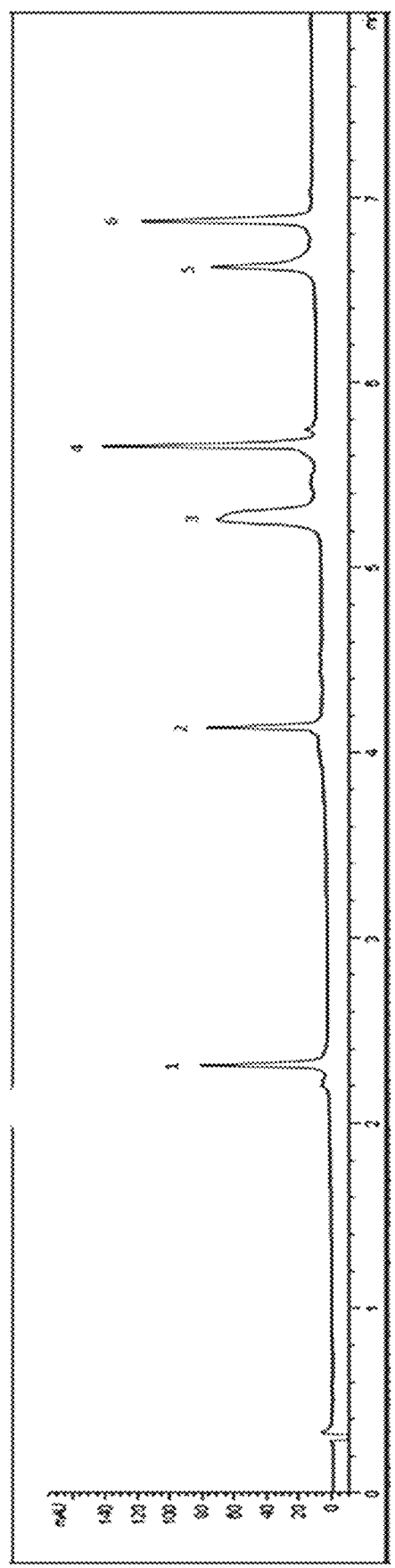
Figure 4A:
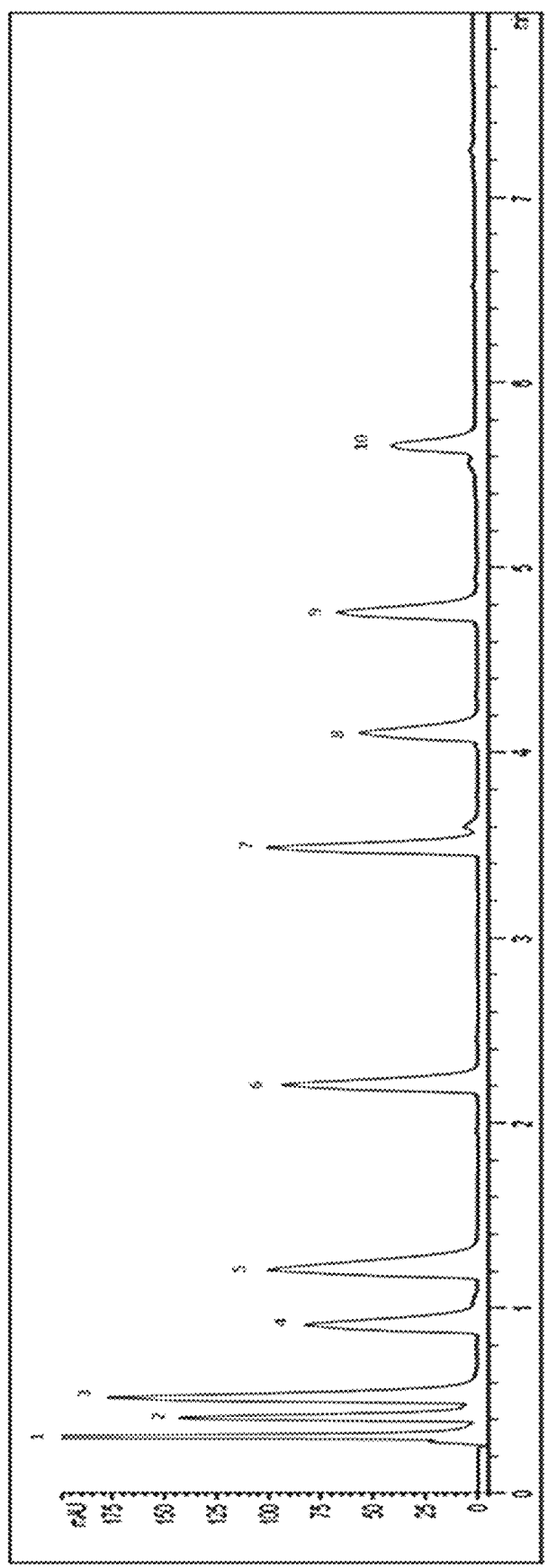
FIGS. 4A-4B show chromatograms of peptide separation from a non-porous silica core column (FIG. 4A) and an etched hybrid core column according to one example (FIG. 4B). Chromatographic conditions: temp.=60° C.; flow rate=0.3 mL/min; injection volume=2.0 µL; gradient=15-65% B over 12.5 min; sample MW range(identified by the following numbered peak)=0.7-2.8 kDa (1-Bradykinin frag 1-7, 756.85; 2-Bradykinin, 1060.21; 3-Angiotensin II (human), 1045.53; 4-Neurotensin 1672.92; 5-Angiotensin I (human), 1296.48; 6-Renin substrate porcine, 1759.01, 7-[Ace-F-3,-2 H-1] Angiotensinogen (1-14), 2231.61; 8-Ser/Thr Protein Phosphatase (15-31), 1952.39, 9-[F14] Ser/Thr Protein Phosphatase (15-31), 2099.00, 10-Melittin (bee venom), 2846.46. All molecular weights in kDa).
Figure 4B:
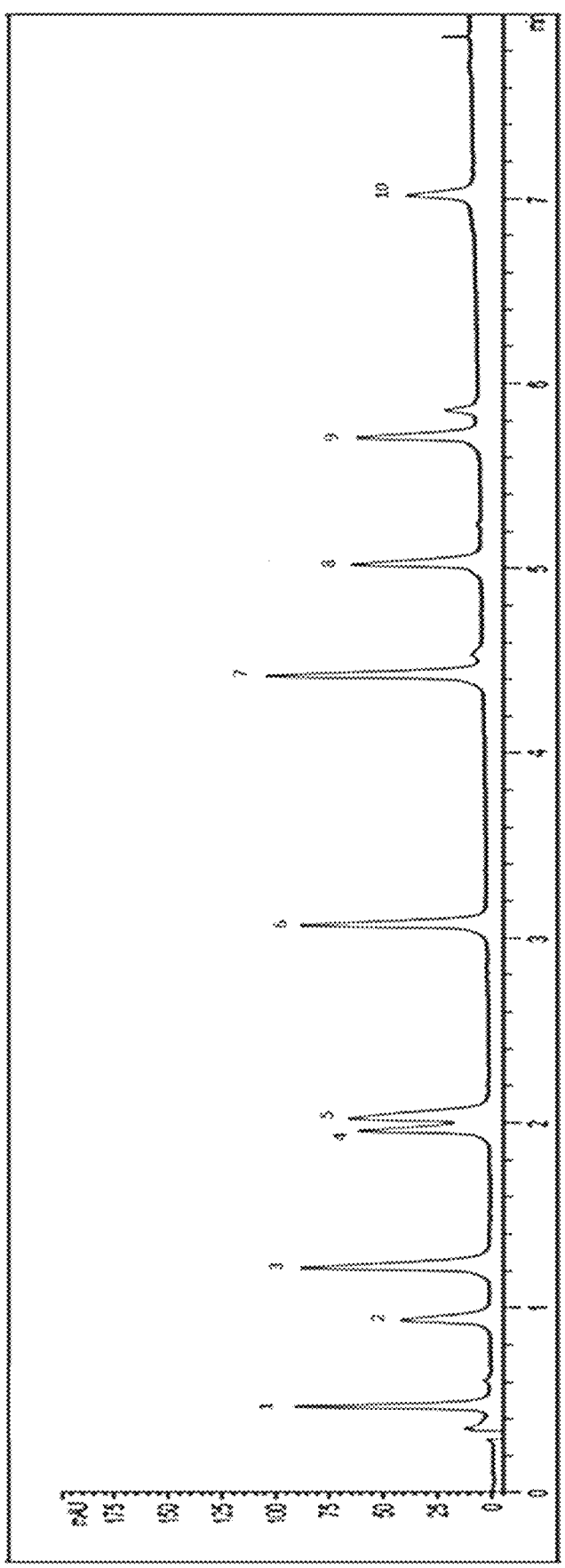
Figure 5A:
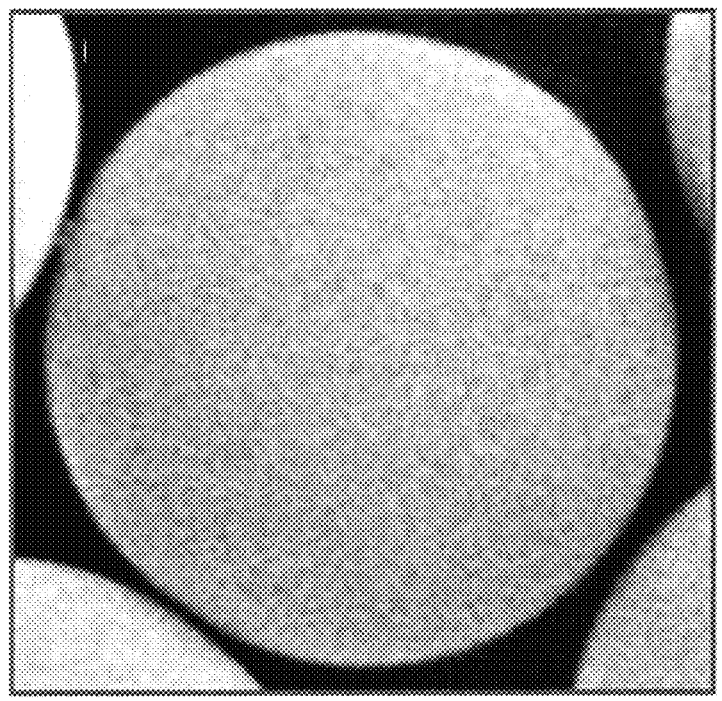
FIGS. 5A-5B are SEM (scanning electron microscopy) images of particles before (FIG. 5A) and after (FIG. 5B) etching showing the formation of a rough surface after etching.
Figure 5B:
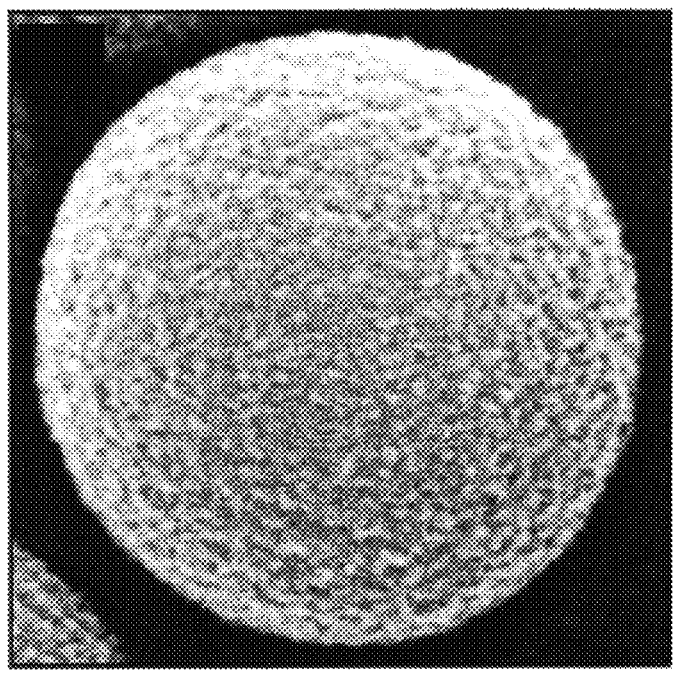
Figure 7A:
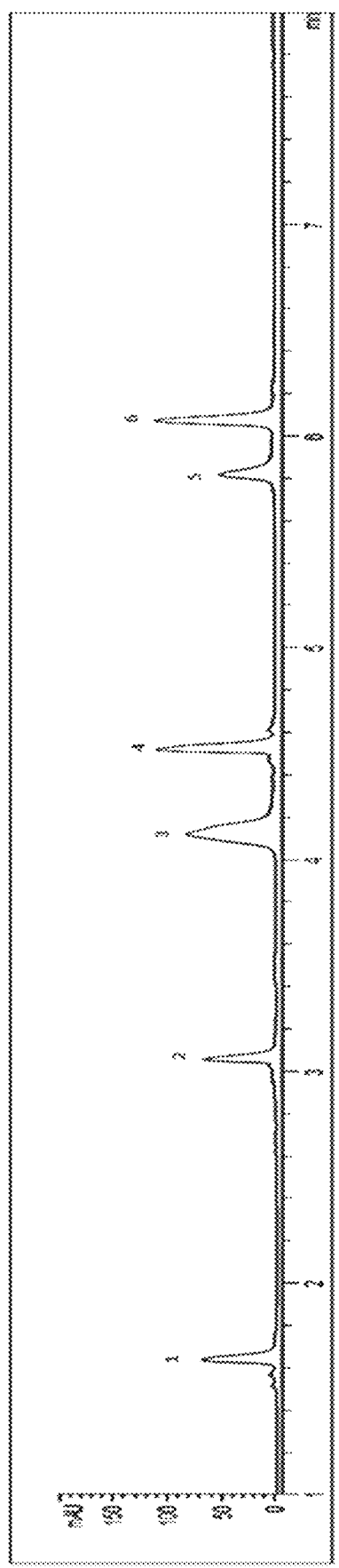
FIGS. 7A-7D show chromatograms of protein separation from (FIG. 7A) a nonporous silica core column, (FIG. 7B) a column containing etched hybrid core particles according to one example, (FIG. 7C) an Agilent AdvanceBio RP-mAb column, and (FIG. 7D) a Zorbax RRHD 300 column. The sampled tested were the same as those tested in FIGS. 3A-B. Etched hybrid core particles with thin rough surfaces have longer retention times than non-porous cores and demonstrate similar retention times compared to wide pore superficially porous particles and only slightly lower retention times than completely porous wide-pore particles.
Figure 7B:
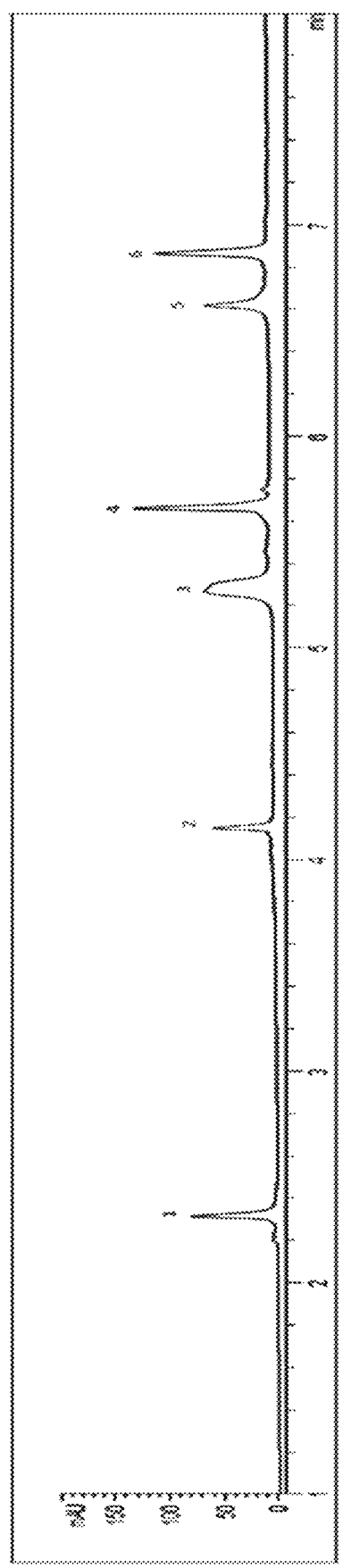
Figure 7C:
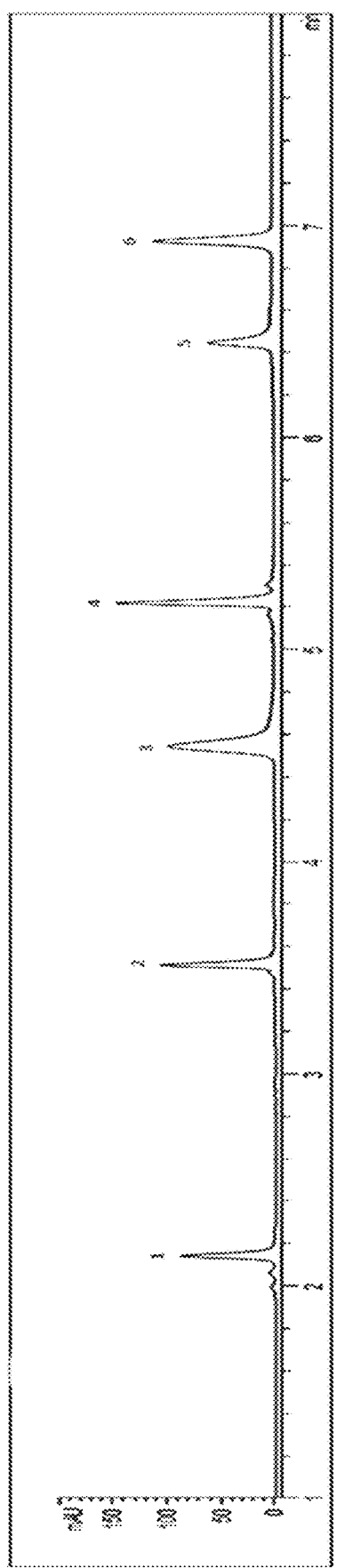
Figure 7D:
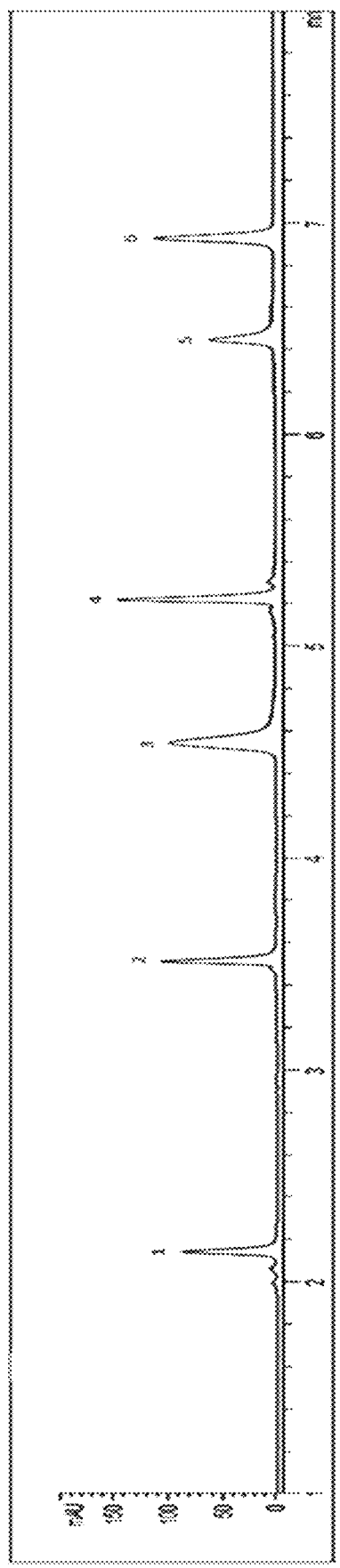

When running the same protein test on the etched hybrid core column, narrower peak widths and higher peak capacities were observed compared to those on solid core columns (FIGS. 3A-3B). The performance of the etched particles, in one example, matched the best commercial column (Agilent AdvanceBio RP-mAb) and (Agilent ZORBAX RRHD 300 Å) for this type of separation (FIGS. 7B-7D), while also exhibiting superior pH stability compared to particles such as those described in U.S. Pat. Nos. 9,284,456 and 6,686,035, for example. The same conclusion can be drawn from peptide separation in FIGS. 4A-4B.

Figure 11A:
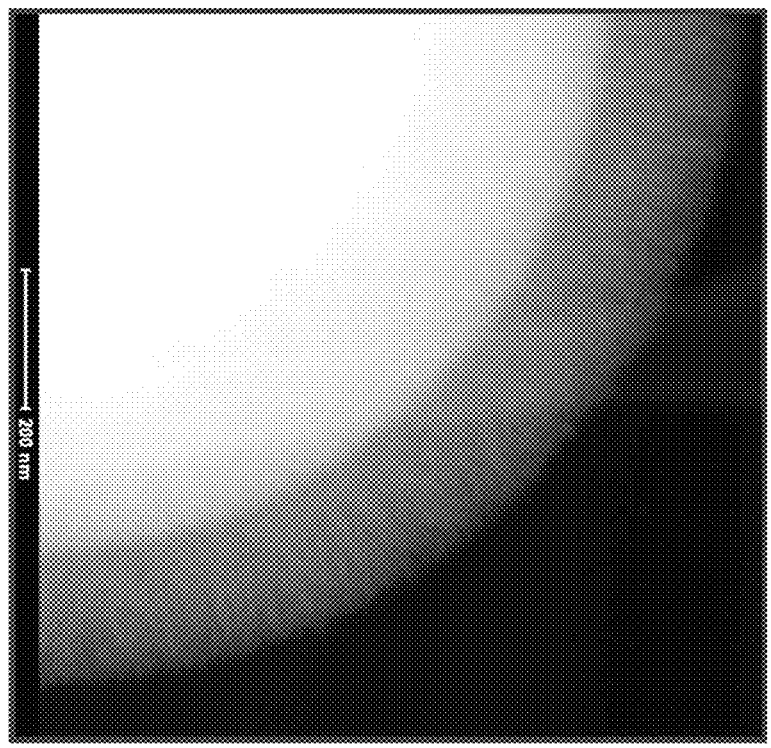
FIGS. 11A-11B show TEM images of the edges of core-shell particles (FIG. 11A) and etched core particles (FIG. 11B). The particle in FIG. 11A has a thick porous layer but is not accessible to biomolecules (e.g. proteins, antibody fragments, intact mAbs. etc.) due to small pore sizes that lead to restricted diffusion. In contrast, the etched surface of the particle in FIG. 11B has no restricted diffusion problem.
Figure 11B:
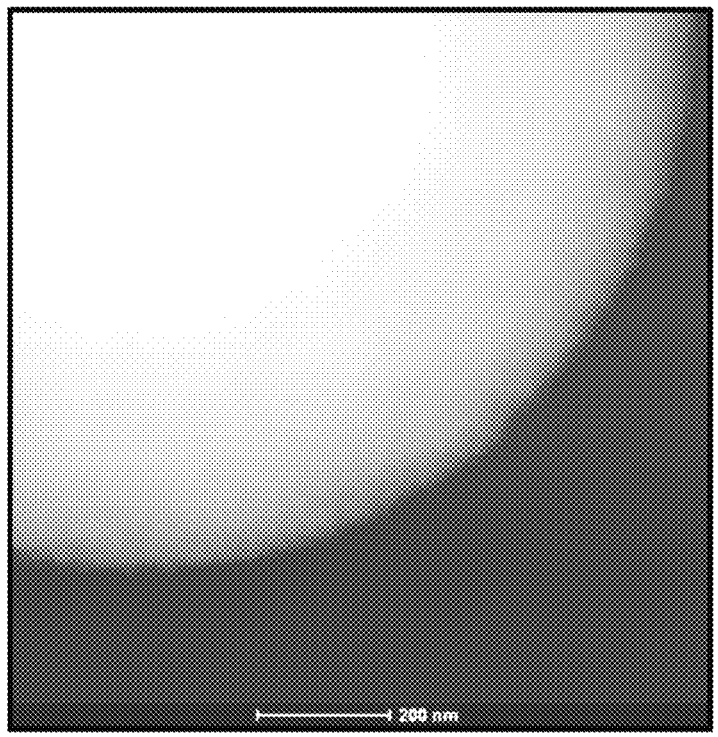

SEM images of particles before and after etching clearly show the formation of a rough surface during etching (FIGS. 5A-5B, 9A-9B, 10A-10B). TEM images of particles before and after etching clearly showed the formation of a shallow rough surface during etching (FIGS. 10A-10B) and the thickness of the roughened surface was much thinner than commercial superficially porous particles (FIGS. 11A-11B) that resulted in a much-reduced diffusion path for highly efficient separation of biomolecules.

Figure 6:
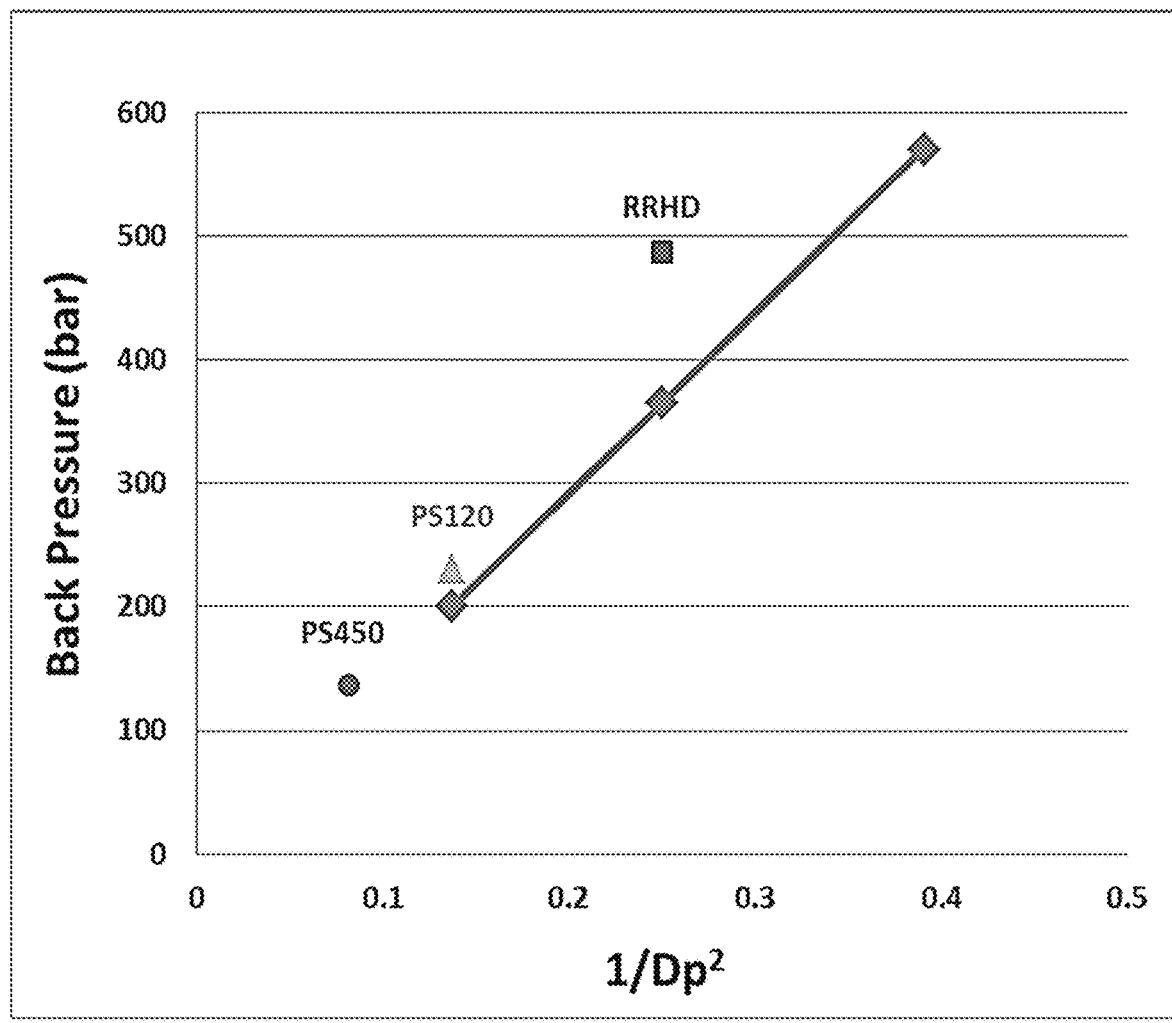
FIG. 6 illustrates that columns loaded with etched particles show comparable back pressure to those packed with porous particles. Back pressure (bar) is plotted as a function of 1/Dp2, where Dp is the average particle diameter. All particles were packed the same way under high pressure and tested under 70/30 H$_2$O/acetonitrile as mobile phase. The particle strength of the etched particles, in one example, is equal to or greater than comparably sized porous particles.
Figure 8:
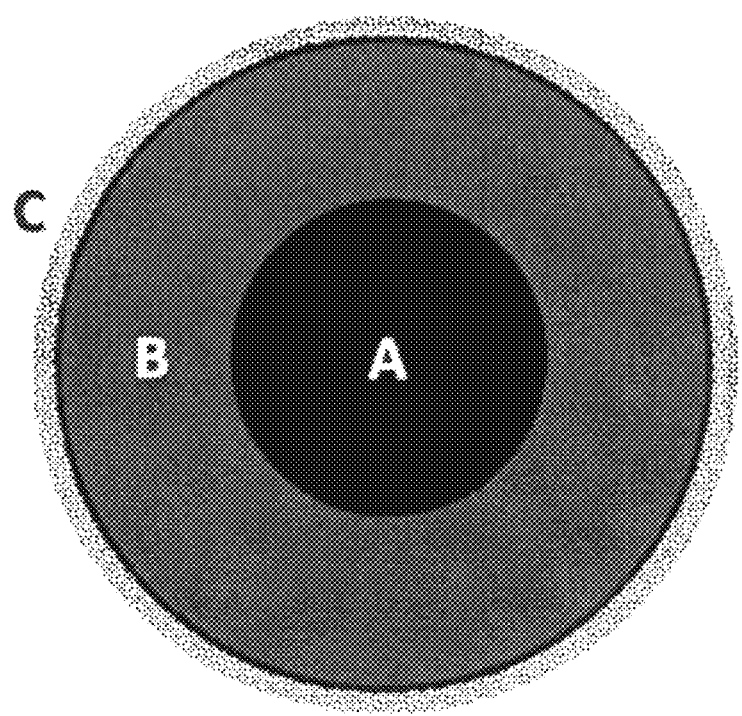
FIG. 8 illustrates one example of the etched particles described herein. In one example, A is a hollow core or a solid core of inorganic or inorganic/organic metal oxide or polymeric or magnetic materials; B is a second solid layer of inorganic or inorganic/organic metal oxide or polymeric or magnetic materials; and C is a thin, etched layer of inorganic metal oxide or inorganic/organic metal oxide.
Figure 10A:
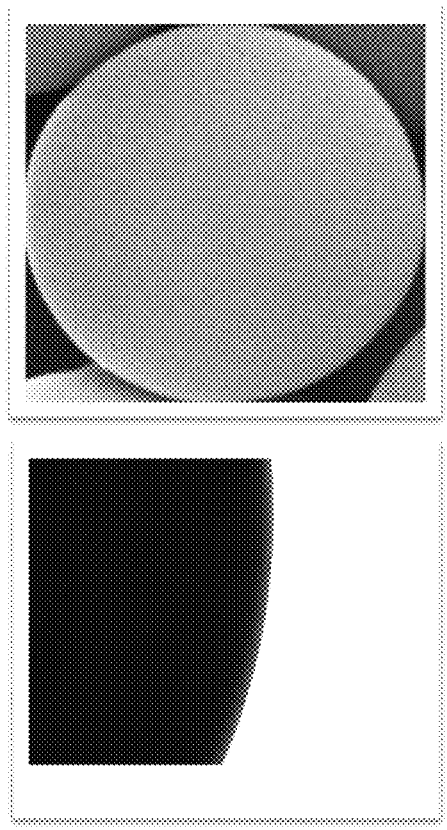
FIGS. 10A-10B show TEM (transmission electron microscopy) edge-on images of non-porous silica cores (FIG. 10A) and etched hybrid cores according to some examples (FIG. 10B).
Figure 10B:
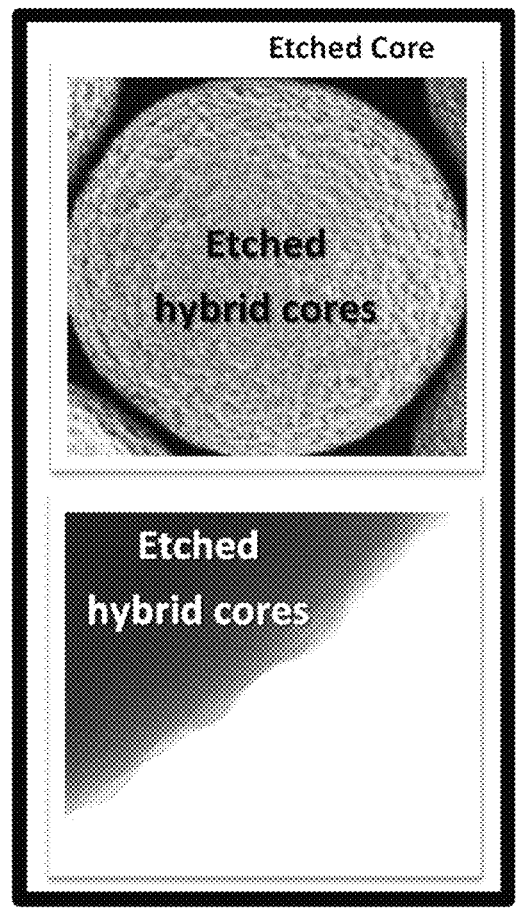

Columns loaded with etched particles showed comparable back pressure compared to those packed with porous particles (FIG. 6). This demonstrated that etched particles, according to some examples, have better or compatible mechanical strength over commercial particles. In one example, the method described herein can be applied to make other etched surface core particles with various physical combinations for different purposes. For example, a hollow core can lower the particle density and can reduce the impact on particles hitting the outlet frit during packing, or other inorganic/organic metal oxides for better pH stability and/or applications (FIG. 8).

Example 2: Commercial Process for Producing Etched Non-Porous Particles

Table 2 lists four stages of manufacturing a finished non-porous etched particle suitable for commercial applications.

TABLE 2

Etched non-porous particles can be produced in one week which is shorter than porous particles.

| Stage | Process | Description | Mfg. Time (day) |
|---|---|---|---|
| 1 | Core Synthesis | Core synthesis | day 1 |
|   |   | Core purification and drying | day 2-3 |
| 2 | Core Coating | Coat core with hydrophilic polymer as described herein | day 3 |
| 3 | Core Etching | Acid/base etch as described herein | day 3-4 |
|   |   | Filter and dry etched cores overnight as described herein | day 4-5 |
|   | Surface Area Measurement | Collect surface area measurements for silanes calculation | day 5-6 |
| 4 | Bonding of Etched Cores | C8 and/or C18 functionalization, and endcapping | day 6-7 |

In Stage 1, according to one example, the desired non-porous particles are synthesized, purified, and dried. The synthesis of the non-porous particles can be as described herein or by another suitable process known in the art.

In Stage 2, according to one example, the non-porous particles are coated with hydrophilic polymers according to the methods described herein.

In Stage 3, according to one example, the coated non-porous particles are etched, filtered, and dried, according to the methods described herein. The surface area of the dried etched particles is determined and the particles are categorized based on silanes calculations. The surface silanol density of porous silica is estimated as 8 OH per nm$^2$. Thus the amount of silane added can be calculated based on 1:1 ratio of OH:silane.

In Stage 4, according to one example, the etched non-porous particles are bonded/functionalized with the desired length of silane. For example, surface modification can be accomplished using a trialkoxy(octadecyl)silane (C18 functionalization), a trialkoxy (octyl)silane (C8 functionalization), or a combination of a C8 and a C18-silylating agent according to art recognized methods. Endcapping can be used to react any free silanol (Si—OH) groups on the surface of the etched non-porous particle by reacting the particles with an endcapping agent, such as trimethylsilylchloride or another suitable agent known in the art.

The terms and expressions employed herein are used as terms of description and not of limitation, and there is no intention in the use of such terms and expressions of excluding any equivalents of the features shown and described or portions thereof, but it is recognized that various modifications are possible within the scope of the embodiments of the present application. Thus, it should be understood that although the present application describes specific embodiments and optional features, modification and variation of the compositions, methods, and concepts herein disclosed may be resorted to by those of ordinary skill in the art, and that such modifications and variations are considered to be within the scope of embodiments of the present application.

What is claimed is:

1. A particle comprising:
a non-porous core with an etched surface;
a layer comprising an etched surface, the layer at least partially coating the non-porous core with at least one material chosen from a hydrophilic polymer, an inorganic metal oxide, a hybrid metal oxide, or a magnetic material;
wherein the hydrophilic polymer includes at least one polymer chosen from poly(N-isopropylacrylamide) (PNIPAM), polyacrylamide (PAM), poly(acrylic acid), polymethacrylate, poly(ethylene glycol), poly(ethylene oxide), poly(-oxazoline) and polyethylenimine (PEI), poly(vinyl alcohol) (PVA), and poly(vinylpyrrolidone) (PVP); the inorganic metal oxide is ZnO or a or a mixed metal oxide; the hybrid metal oxide is a combination of an organic component and ZnO or a or a mixed metal oxide;
wherein the particle has a pore volume of from about 0.001 to about 0.1 cm$^3$/g, a surface area of from about 2 to about 100 m$^2$/g, or a combination thereof;
wherein the particle includes a diameter of from about 0.3 μm to about 10 μm; and
wherein the etched surface is a roughened surface.

2. The particle of claim 1, wherein the organic component includes an organosilyl group.

3. The particle of claim 2, wherein the organosilyl group includes one or more R-Si moieties, where the R group includes a/an hydrocarbyl, alkenyl, alkynyl, aryl, hydroxyl, carboxylic acid, esters, ethers, amide group, or combinations thereof.

4. The particle of claim 1, wherein the non-porous core is chosen from a hollow core, an inorganic metal oxide core, a hybrid metal oxide core, a polymeric core, or a magnetic core.

5. The particle of claim 4, wherein the inorganic metal oxide includes an inorganic metal oxide chosen from ZnO, SiO$_2$, and M/SiO$_2$, wherein M is chosen from Au, Ag, Ni, Fe, Co, FeNi, ZnO, CdS, AgI, CdTe, CdSe, and CaCO$_3$.

6. The particle of claim 4, wherein the magnetic core includes a ferromagnetic substance chosen from Fe3O4, neodymium-based material, or a combination thereof.

7. The particle of claim 4, wherein the etched surface includes a silane.

8. The particle of claim 7, wherein the silane is chosen from trialkoxy(octadecyl)silane, a trialkoxy (octyl)silane, or a combination thereof.

9. The particle of claim 7, wherein the etched surface includes an endcapping agent.

10. The particle of claim 9, wherein the endcapping agent is a trialkoxy (octyl)silane.

11. The particle of claim 1, wherein the non-porous core is silica.

12. A particle comprising:
a non-porous core;
a hydrophilic polymer layer comprising an etched surface;
wherein the hydrophilic polymer layer includes at least one polymer chosen from poly(N-isopropylacrylamide) (PNIPAM), polyacrylamide (PAM), poly(acrylic acid), polymethacrylate, poly(ethylene glycol), poly(ethylene oxide), poly(-oxazoline) and polyethylenimine (PEI), poly(vinyl alcohol) (PVA), and poly(vinylpyrrolidone) (PVP);
wherein the particle has a pore volume of from about 0.001 to about 0.1 cm$^3$/g, a surface area of from about 2 to about 100 m$^2$/g, or a combination thereof;

wherein the particle includes a diameter of from about 0.3 µm to about 10 µm; and wherein the etched surface is a roughened surface.

\* \* \* \* \*